United States Patent [19]

Haried

[11] 4,267,643
[45] May 19, 1981

[54] PROCESS AND APPARATUS FOR CONSERVING ENERGY IN LAUNDRY EQUIPMENT

[76] Inventor: John C. Haried, 1616 Kenilworth Pl., Aurora, Ill. 60506

[21] Appl. No.: 100,253

[22] Filed: Dec. 4, 1979

[51] Int. Cl.³ ............................................ F26B 21/10
[52] U.S. Cl. .......................................... 34/48; 34/55
[58] Field of Search ................................ 34/46, 48, 55

[56] References Cited
FOREIGN PATENT DOCUMENTS 1516501 7/1978 United Kingdom .................... 34/48
1521532 8/1978 United Kingdom .

Primary Examiner—Larry I. Schwartz
Attorney, Agent, or Firm—James E. Anderson

[57] ABSTRACT

In a tumbler type of dryer, particularly for large capacity commercial and institutional laundries, a heating control system is provided which is responsive to the rate of increase of temperature of hot air leaving the dryer. When this temperature increase exceeds a preselected rate the dryer control system is automatically instructed to shut off or diminish the hot air supply, as well as the tumbler operation if desired. Thus energy is not wastefully consumed after the laundry is already dry; on the other hand, the dryer does not prematurely shut down while laundry is still damp, whereby the dryer must be started up again and energy again is unnecessarily wasted. Different settings are selected in accordance with the characteristics of the type of laundry being processed.

1 Claim, 5 Drawing Figures 4,267,643

PROCESS AND APPARATUS FOR CONSERVING ENERGY IN LAUNDRY EQUIPMENT

BACKGROUND OF THE INVENTION (1) Field of the Invention

Electric timing controls for equipment for drying of laundry such as linens, clothing and other fabrics.

(2) Description of the Prior Art

Typical large capacity commercial apparatus (in the 50 to 400 pounds per load range) for drying washed bedding, towelling, cleaning rags, work uniforms and the like are either gas-oil fired or steam heated. In order to reduce the wasting of fuel, i.e., to utilize fuel or steam heat most effectively, the heating system of the dryer must be controlled to a finer degree than has been practised heretofore.

In a common type of steam-heated dryer the drying cycle is arbitrarily terminated solely by a manually preset timer, which may either initiate an audible device to prompt manual turnoff, or automatically turn off the heating means. In some systems this event may effect bypassing of air around the steam coils and the blower later is turned off by running of a second manually preset timer during a cooling cycle. In gas or gas/oil fired dryers, a high flame first raises the air temperature to a predetermined temperature at a fast rate, and low flame takes over until a manually preset timer arbitrarily shuts off the heat. (The heat and low flame can be modulated automatically in response to temperature sensing until the timer winds down.)

Ineffective utilization of energy occurs either when the machine operator determines that the load is not sufficiently dry at the end of a batch cycle and therefore restarts the cycle, or when the load was sufficiently dry long before the machine heating cycle was terminated—both of these situations waste energy. One cause of either such condition is the reliance on human judgement, either in setting the time and/or temperature limits, or in other respects, such as by incorrectly estimating the weight or moisture content of the load. it is an object of this invention to provide a dryer control system in which the optimal amount of energy is applied to bring the load to its desired final state of dryness, or moisture content.

BRIEF SUMMARY OF THE INVENTION

In accordance with this invention it has been determined that the aforementioned energy management problems inherent in existing dryers are caused wholly or in part by a blind reliance upon signaling of an elapsed time or attainment of a predetermined temperature to dictate the cycle, and they inherently cannot respond automatically to an analog of the many operating variables that exist in practice. Variables that affect optimum rate and amount of energy input include: weight of the load, moisture content, fabric texture and composition, operator skill, room humidity and entrained chemical agents. Heating of two different loads for "x" minutes can bring them to widely separated temperatures; hence, the time to reach "y" temperature is not the same for all loads. Heating of two different loads to "y" temperature may consume different elapsed times; hence, the temperature reached after "x" minutes is not the same for all loads.

It has been discovered that a sensing of the degree of increase of temperature at faster than a certain rate is an indicator that the predominant portion of the heat load, namely, the heat of vaporization, has been expended, and the continued application of heat is beginning to be attritubable to the less-intensive process of heating the fabrics themselves. In the simplest embodiment of my invention, I rely upon and sense only the rate of increase of temperature in the air discharge, and when this measurement exceeds a predetermined setting the heating cycle is interrupted or otherwise retarded.

DESCRIPTION OF THE PREFERRED EMBODIMENT

Figure 1:
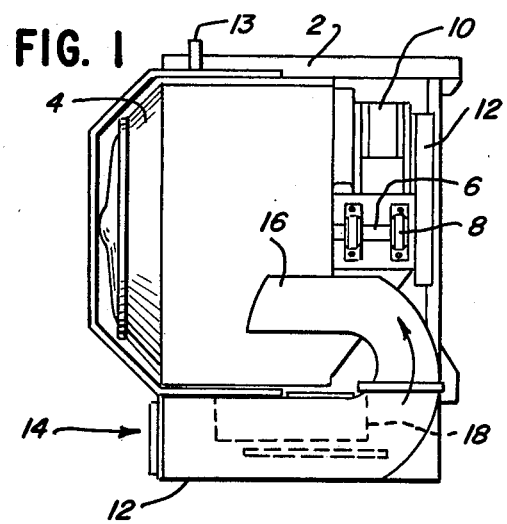
FIG. 1 is a top view of a large capacity industrial and institutional type of tumbler.
Figure 2:
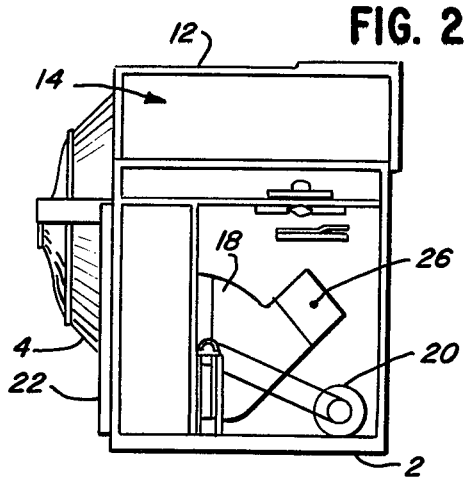
FIG. 2 is a side view of the dryer shown in FIG. 1.

One well-known model of dryer of the tumbler type, i.e., embodying a rotating perforated drum through which hot air is drawn, is shown in FIGS. 1 and 2. Such a dryer typically is installed in laundries for cleaning linens, bedding, work clothes, work mops rags and the like, as usually installed in commercial laundries, hospitals, factories and so forth.

The tumbler dryer as shown is housed within a surrounding channel or tubing frame 2. An outer shroud 4 houses a drum (not shown) having ¼ inch perforations for circulation of hot air in the usual manner, which is rotatably mounted on a shaft journalled in bearing blocks 8. Shaft 6 is driven through a chain or belt transmission 12, powered by an electric motor 10.

Hot air enters the tumbler housing 4 through an oil or gas-fired burner (steam also can be used) generally indicated at 14 and having a main housing and exit duct 16. In this particular size of dryer with approximately a 160 cubic foot capacity the burner 14 should deliver approximately one to three billion BTU's per hour.

Water-laden air is forcefully circulated through the dryer under negative pressure generated by a blower or fan 18 typically having a capacity of 10,000 CFM in this particular dryer. Blower 18 is driven by an electric motor 20. The foregoing description presents one typical form of environment for application of this invention, but as will be seen hereafter the invention is applicable to other types and makes of drying equipment.

Figure 4:
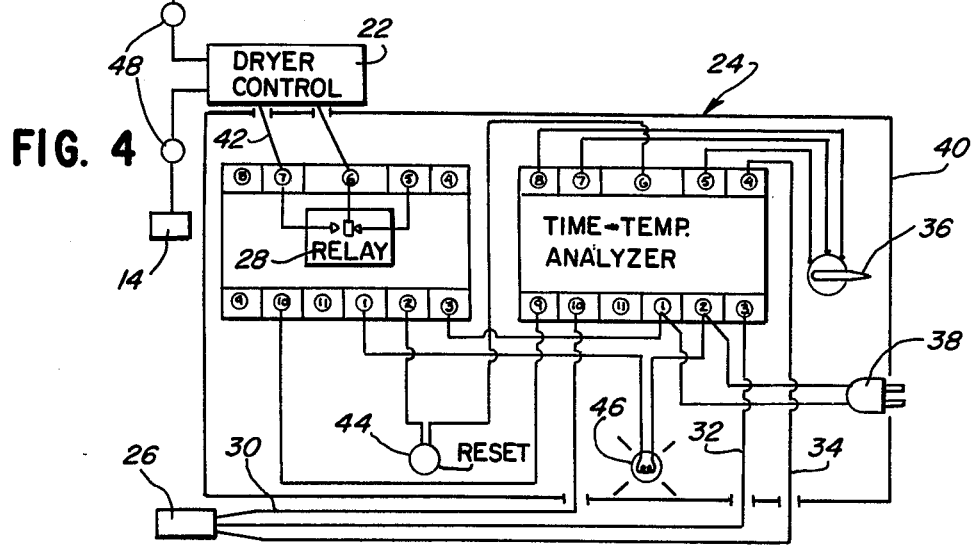
FIG. 4 is a schematic block diagram of the electronic controls for the dryer in accordance with this invention.
Figure 5:
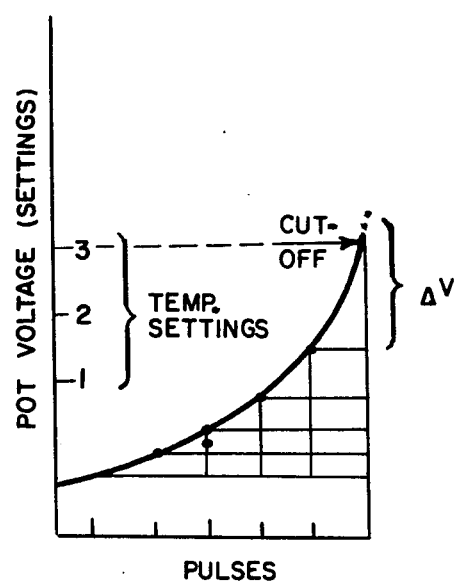
FIG. 5 is a graph to explain the pulsing/memorizing circuit responsible for the effects of FIG. 4.

The underlying theory of the invention is generally explained by reference to FIG. 2, and the electronic hardware for implementing the methodology are shown in FIGS. 4 and 5.

FIG. 2 is a graph of discharge temperature as sensed by a thermistor 26, which is mounted at the discharge duct of blower 18, versus elapsed time commencing at the beginning of the drying cycle. Curves #1, #2 and #3 are time-temperature curves which result when different types of fabrics are handled by the dryer, and it will be noted that these curves differ. A small load of terrycloth will be dry at about 181° F., versus 170° F. for mops, rags and small pieces, and 160° F. for cotton spreads, thermal blankets and mattress pads, i.e. at different temperatures. In reverse, however, on curve #1, although drying was completed at a higher temperature, it consumed thermal energy during a shorter period of time. Thus, as explained in the introduction to this application, it is wasteful of energy either to prolong the drying cycle beyond the attainment of the adequate temperature and/or the necessary time period.

Note in FIG. 2 that the slope of each curve is measured by coordinates dy and dx, as is commonly known in differential calculus. As the load of laundry approaches approximately "dry" condition the ratio of dy to dx increases. From close analysis of these curves it will be found that this slope begins to increase at a faster rate as the laundry approaches the temperature at which it has been generally determined that it will or should be in the final stage of being fully dried. A primary feature of this invention is to sense when this rate of increase is just occurring and to interrupt or diminish the supply of heat to the dryer mechanism.

Referring to FIG. 4, there is schematically shown a control system that can be packaged as a unit intended to be simply plugged into the control panel 22 of practically any commercial or institutional dryer already in operation. Its main electronic hardware is a Time-Temperature Analyzer, generally indicated at 24, which operates in response to a sensor bulb 26 in the blower outlet duct (FIG. 1) to open and close the contacts of a relay 28. The operation of relay 28 controls the on-off operation of dryer controls 22.

The inner circuitry of the Time-Temperature Analyzer need not be disclosed in detail because the principles of pot voltages set to trigger other events are well known and the components therefor are available commercially. Thermistor bulb 26 has a compensating lead, ground lead 32, and linear measurement lead 34.

The system works on the basis of a standard pulsing circuit and three or more available pot voltages that can be set at level 1, 2 or 3, selectively picked by the manually set dial 36 shown in FIG. 4. A pulse can be emitted, for example, once each second, and the resultant voltage is held or memorized as a zero base for the next pulse. It will be noted in FIG. 5 that as the blower exhaust temperature rises steeply, each voltage increment (dV) will be greater than the preceding one, whereas these increments remain approximately equal when the blower outlet temperature is increasing at a fairly constant rate. When a latest dV reaches or exceeds the preset pot level, relay 28 is triggered to shut off or diminish the operation of burner 26 at the optimum instant when the laundry has been adequately dried, thereby having conserved energy; or when the dryer cycle would have to be repeated in the case of overly damp laundry as in the case of a conventionally controlled dryer. This is now avoided and again there is conservation of energy.

Figure 3:
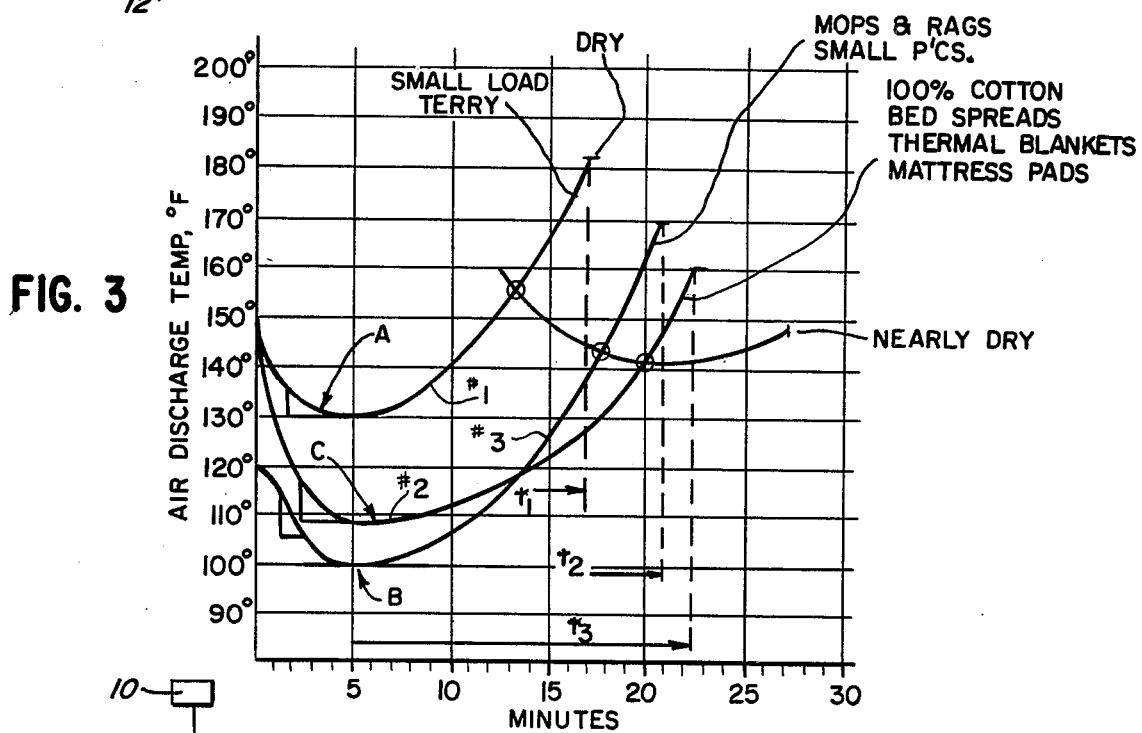
FIG. 3 is a chart of drying time versus blower exhaust temperature for cycles of drying of different types of laundered products.

A variation that is available in the utilization of this invention is to sense rate of change of temperature in another way. Referring again to FIG. 3, sensing of the relation dy:dx at points A, B and C will signal a flat curve, in effect. The early drop in temperature down to points A, B and C indicates that a considerable amount of moisture has been physically removed from the laundry materials, and an upturn in temperature will then accelerate the evaporation of moisture. Through empirical experimentation over a period of time, the average times $t_1$, $t_2$, $t_3$, can be determined, respectively for each general type of segregated products being laundered; preset variable timers 48 can then take over the control function once the TTA has detected a predetermined dy:dx relationship. In other words, the signalling of a predetermined rate of increase in temperature in the exhaust air also can be used as a reference point from which a time period can be measured before the tumbler drive will be stopped. (The rate of decrease of temperature conceivably might also be detected and similarly utilized, as indicated by the dy/dx coordinates shown on the downwardly sloping portions of the curves in FIG. 3.) The timing can be set so that the burner stops while the tumbler continues to rotate for a further period of time, e.g., until the access door is opened.

The entire electrical system shown in FIG. 4 is powered from a 115 volt a.c. source connected by a standard plug 38, and its output to the original equipment dryer controls 22 is transmitted thereto by specially installed leads 42. This circuitry is completely enclosed in a housing or box 40 which can be simply installed within the control compartment of an existing dryer. It should be understood, however, that this system also can be incorporated directly into the control circuitry of a newly constructed dryer during the course of its manufacture. It should be similarly understood that this system is not limited to application to large commercial and institutional dryers, where total energy costs are more important to operating costs and are more subject to governmental controls, but is also applicable to the household varieties.

In summary, this invention serves to conserve energy by ensuring that washed laundry is dried for an optimum period of time—not too long and not too short.

I claim:

1. A process for controlling the duration of a cycle of operation of equipment for drying launderable products such as bedding, towels, clothing and the like, having a closed compartment for containing material to be dried, ducts for directing air into and out of said compartment, and controllable means for inducing the flow of air through said duct system, means for heating air prior to entry into said compartment, and means for controlling the last-mentioned means; said process comprising the steps of:
   (a) heating said products at a rate sufficient to effect a decreasing level of discharge temperature of air leaving said duct system at a gradually decreasing rate until said rate of change thereof approaches zero and its temperature begins to increase at a non-linear rate;
   (b) sensing a rate of increase of temperature of said air as it increases at said non-linear rate; and
   (c) in response to sensing a rate of increase in said temperature which exceeds a predetermined rate of increase, initiating the operation of said controlling means to effect a decrease in the operation of said means for heating of air prior to entry thereof into said compartment.

* * * * *